United States Patent [19]

Okatani

[11] Patent Number: 4,872,067
[45] Date of Patent: Oct. 3, 1989

[54] METHOD OF REPRODUCING VIDEO INFORMATION IN A DISK PLAYER, INCLUDING COMPENSATION FOR CONDITIONS IN THE DISK AND IN THE PLAYER

[75] Inventor: Masanao Okatani, Tokyo, Japan

[73] Assignee: Pioneer Electronic Corporation, Tokyo, Japan

[21] Appl. No.: 133,836

[22] Filed: Dec. 16, 1987

[30] Foreign Application Priority Data

Dec. 16, 1986 [JP] Japan .............................. 61-300548
Dec. 17, 1986 [JP] Japan .............................. 61-300504

[51] Int. Cl.$^4$ .............................................. H04N 5/85
[52] U.S. Cl. .................................... 358/341; 358/342
[58] Field of Search .............. 358/342, 335, 336, 343, 358/341; 360/33.1, 19.1, 38.1; 369/32

[56] References Cited

U.S. PATENT DOCUMENTS 4,476,499 10/1984 Kanamaru et al. ................. 358/342
4,602,295 7/1986 Moriyama et al. ................. 358/343
4,707,818 11/1987 Suzuki et al. ...................... 358/342

*Primary Examiner*—Donald McElheny, Jr.
*Attorney, Agent, or Firm*—Sughrue,Mion,Zinn,Macpeak & Seas

[57] ABSTRACT

Methods of preventing output of noise to a television monitor during existence of unusual conditions in a disk player. In accordance with one such method, when the disk player is reproducing information recorded on a composite disk storing both audio and video information, and a search is conducted which requires the pickup of the disk player to cross a boundary between the two regions on the composite disk, the most recently-reproduced video information stored in a video memory is repeatedly read and reproduced on a television monitor during the search. In accordance with another method, when an off condition of a main power supply is detected, the most recently read video information just prior to detection of the off condition is stored in a video memory, and is repeatedly read out until the disk player has been reinitialized. Additionally, the last known address of the pickup prior to power supply interruption is stored, and the pickup is moved back to that location so that the reproducing operation may be resumed without the need for an additional search by the user.

9 Claims, 6 Drawing Sheets

METHOD OF REPRODUCING VIDEO INFORMATION IN A DISK PLAYER, INCLUDING COMPENSATION FOR CONDITIONS IN THE DISK AND IN THE PLAYER

BACKGROUND OF THE INVENTION

The present invention relates to a method of reproducing video information recorded on an information recording disk. The inventive method includes a method of compensating for conditions in the disk and the disk player, as will be explained below.

Digital audio disks as small as 12 cm in diameter (called compact disks) are known, and have been used for recording digital audio information. Recently, disks, known as composite disks, which are the same size as a compact disk, have been developed, which contain both a frequency-modulated video signal and a pulse code modulation (PCM) signal which are superposed. An example of such a disk is shown in FIG. 3.

In FIG. 3, a first region 1a in an inner portion of the composite disk is referred to as a CD region. PCM audio information is recorded in this internal portion 1a. In an outer portion 1b referred to as a video region, a frequency-modulated video signal and PCM audio signal are superposed for purposes of recording in that region.

The frequency spectrum of the signal recorded in the video region 1b is shown in FIG. 4. The video signal includes an element having a frequency higher than that of the PCM signal. In FIG. 4, region A corresponds to the PCM signal, and region B corresponds to the video FM signal.

Recording of video signals has been carried out with the disk rotating at a speed higher than that employed in recording audio signals in the CD region 1a. Thus, reproduction of the recorded signal in the video region must be carried out at a faster rotational speed than is used for reproduction of signals in the CD region 1a. As shown in FIG. 5, for example, disk rotation might be several hundred rpm in the CD region 1a, but between 1000 and 3000 revolution per minute (rpm) in the video region 1b. For example, the rotational speed might be 2000 and several hundred rpm at the innermost track in the region 1b, and 1000 and several hundred rpm at the outermost track in the region 1b.

The difference in rotational speed necessary between the CD region 1a and the video region 1b is of particular significance when a search operation is to be carried out which crosses over the boundary between the CD region and the video region during a reproducing operation on the composite disk. In order to achieve stable change in rotational speed, some length of time (settling time) is required. As a result, a search operation crossing over the two different regions can take longer than a search which would be carried out only in one of the two regions.

One undesirable effect of this need for a longer search is deterioration in visual recognition of signals recorded in the video region because of noise arising from the length of time required for the search, and the consequent inability to input video information to a television monitor for a relatively longer period of time.

In addition to noise generated because of a relatively long search which is carried out across the CD and video regions in a composite disk, another source of noise, or otherwise poor reproduction in a video disk, might be a failure of the disk player itself, such as an unexpected power failure during reproduction of signals recorded in the video region. It is possible that reproduction might be suspended for some other reason as well. In such an event, it is necessary to restart reproduction by turning the power switch of the device on. Again, because of the relatively rapid rotation of the disk necessary for reproduction of the video signal, a longer rise time is required until the number of rotations is stabilized. During this rise time, video information is not input to the television monitor for a relatively long time, thereby possibly causing noise to be generated on the television screen, again causing deterioration of visual recognition.

SUMMARY OF THE INVENTION

In view of the foregoing deficiencies, it is an object of the present invention to provide a search method which enables display of video information on a television monitor during a search operation which crosses between a video region and a CD region on a composite disk.

The search method of the present invention includes an improvement wherein the most recently reproduced video information is stored in a video memory in the disk reproducing device. During a relatively long search operation, the stored video information may be repeatedly read and then output as reproduced information.

It is also an object of the present invention to provide a picture reproduction method which is capable of displaying a picture on a television monitoring even during a relatively long rise time during power initiation.

This last-mentioned aspect of the present invention is accomplished by a method containing an improvement wherein the most recently read-out video information detected immediately before a power off condition is stored in the video memory, a disk player containing the video memory being capable of operating with a backup power supply. The stored video information then is repeatedly read and output, even during the rise period necessitated by the turning on of the power switch. According to this method, reproduction may be started once again from the recording position where the most recently read video information was recorded.

BRIEF DESCRIPTION OF THE DRAWINGS

The foregoing and other objects of the present invention will become clear from the following description of the invention, with reference to the accompanying drawings, in which.

DETAILED DESCRIPTION OF THE INVENTION

Figure 1A:
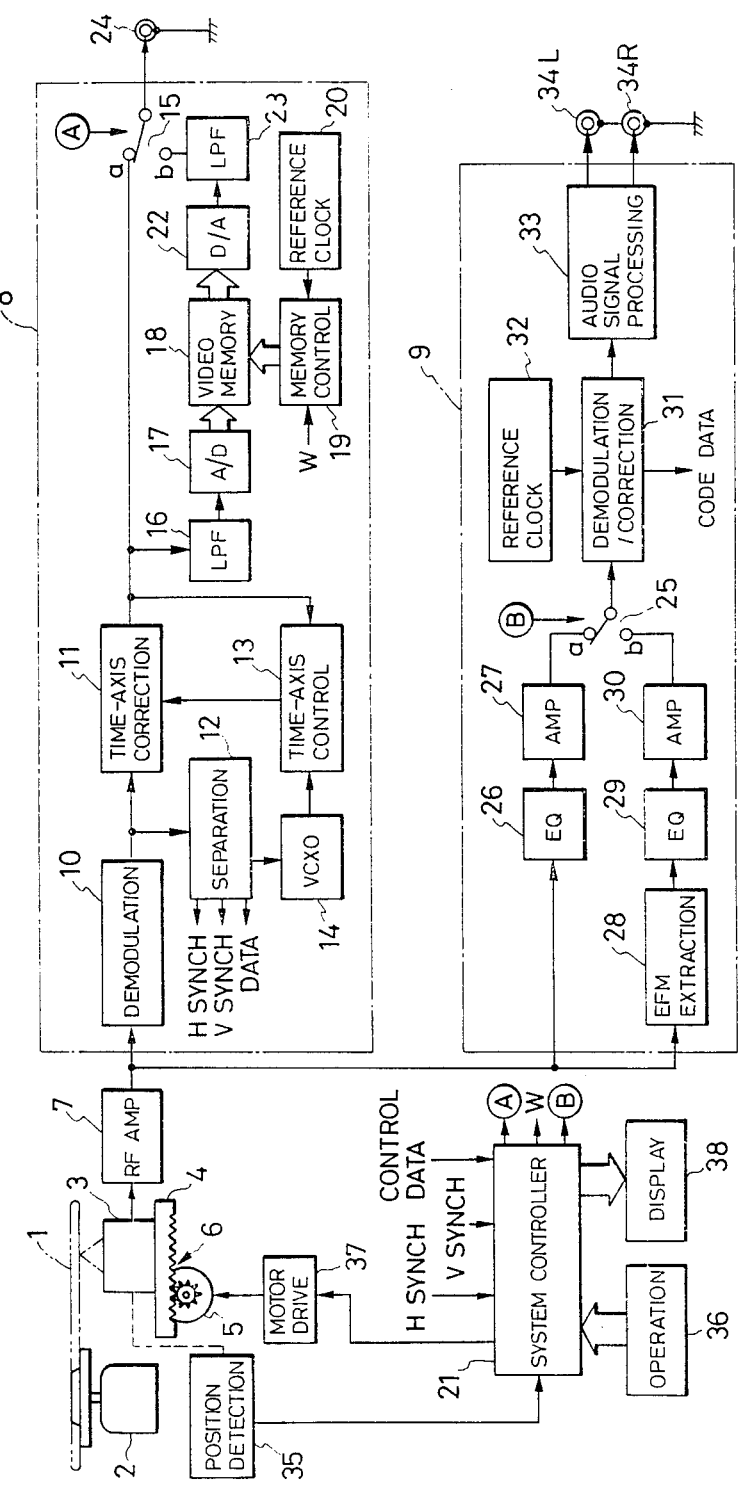
FIGS. 1A, and 1B are examples of disk player structure to which the method of the present invention may be applied.

FIG. 1A shows circuitry and structure for a disk player to which the search method of the present invention may be applied. In the figure, a disk 1 is driven by a spindle motor 2. Information recorded on the disk is read by an optical pickup 3, which comprises an optical system including a laser diode, an object lens, a photodetector, a focus actuator which drives the object lens in the direction of its optical axis, and a tracking actuator which biases an information detecting spot issued from the pickup 3 in the radial direction of the disk. The pickup 3 is mounted on a slider 4 which moves freely in the radial direction of the disk. The slider 4 is driven in a straight line by a slider motor 5, and a transmission mechanism 6 which may be a combination of a rack and pinion, as shown in the drawing. A high frequency RF signal read out from the pickup 3 is supplied to a video information demodulating system 8 and a digital information demodulating system 9 through an RF amplifier 7.

In the video information demodulating system 8, the signal from the RF amplifier 7 is demodulated into a video signal by a demodulator 10. The output of the demodulator 10 is supplied to a time base correcting circuit 11 and a separation circuit 12. The separation circuit 12 separates and extracts the horizontal synchronous signal H, the vertical synchronous signal V, and control data which is included in the video signal.

The time base correcting circuit 11 is formed by a variable delay element, such as a charge coupled device (CCD). The circuit 11 corrects the time base error by varying the delay of the variable delay element in according with the control signal received from a time base control circuit 13. The time base control circuit 13 receives the output of a voltage controlled oscillator 14 and provides that output, and a divided output thereof. The crystal controlled oscillator 14 oscilates in synchronization with the horizontal synchronous signal which is separated and extracted by the separation circuit 12 and with the control signal, in accordance with a phase difference between the horizontal synchronous signal as output by the time base correcting circuit 11 and a color burst signal. One example of appropriate structure for the control circuit 13 is disclosed in Japanese Published Patent Application No. 102182/1981.

The output of the time base correcting circuit 11 is provided as an input of a selector switch 15, and also is supplied to an analog-to-digital (A/D) converter 17 through a low pass filter (LPF) 16. In the A/D converter 17, the video signal is sampled within a predetermined period. The resultant sample values are converted sequentially to digital data. The output of the A/D converter 17 is supplied to a video memory 18, which may be a random access memory (RAM), and other necessary associated components, which are well known to those of ordinary skill in the relevant technological field. The video memory 18 must be large enough to store at least one field of video information.

A memory control circuit 19 provides address control and mode control for the video memory 18. The circuit 19 provides structure for realizing control so that data written into respective addresses of the video memory 18 may be read sequentially in accordance with an output of a reference clock generating circuit 20. The respective addresses of the video memory 18 then may be rewritten in accordance with a write enable signal W output from a system controller 21, as will be described below.

The data read from the video memory 18 is converted to an analog signal by a digital-to-analog (D/A) converter 22, and then is provided as the other input of the selection switch 15 through LPF 23. The selection switch 15 usually is set to the side a, as shown in the figure, so that the video signal output from the time base correcting circuit 11 may be supplied directly to the video output terminal 24. When the selection switch 15 is set to the side b, in accordance with the switching instruction sent from the system controller 21, the signal from the video memory 18 is selected and supplied to the video output terminal 24.

Figure 3:
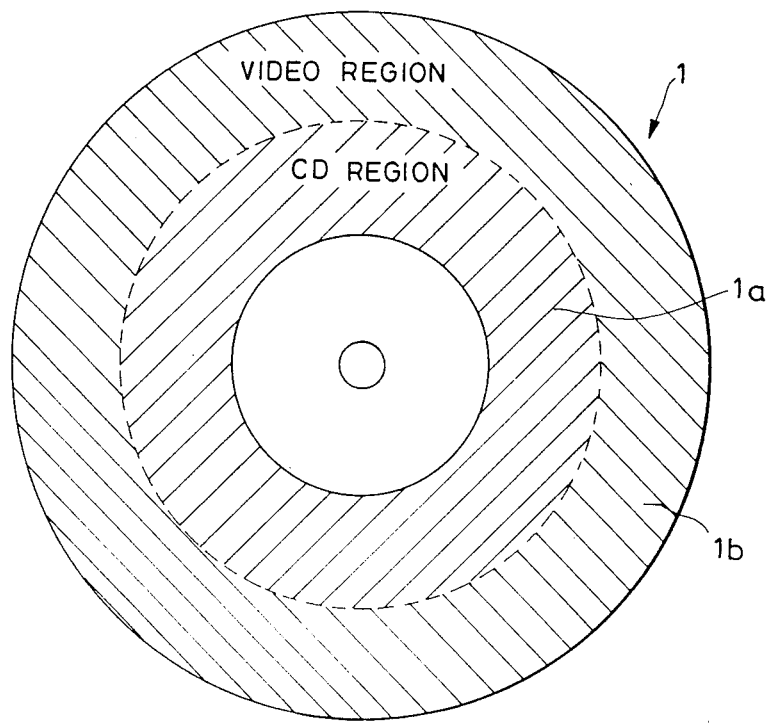
FIG. 3 is an example of a composite disk showing the different recording regions.

The digital information demodulation system 9 is provided with a selection switch 25 which is set depending on whether the information to be reproduced is found in the CD region 1a or video region 1b of the composite disk 1 (FIG. 3). The switch 25 is set to side a during reproduction of signals recorded in the CD region 1a, or the side b during reproduction of signals recorded in the video region 1b. The switching operation of the switch 25 is carried out in accordance with an instruction issued from the system controller 21.

Figure 4:
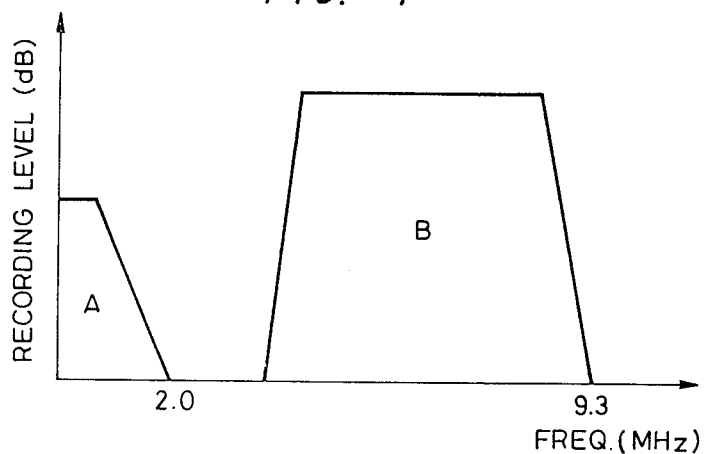
FIG. 4 is a graph of a frequency spectrum of signals stored in the video region of a composite disk.
Figure 5:
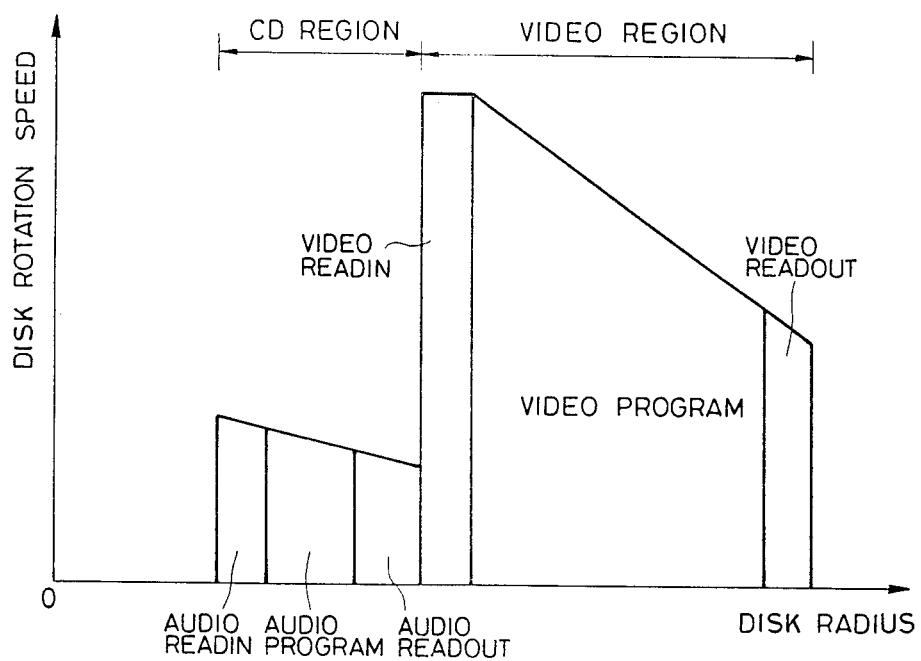
FIG. 5 is a graph showing an assignment of regions for recorded information in a composite disk as a function of disk redius.

As has been discussed earlier, the rotational speed of the disk is very different, depending on whether it is the CD region or the video region which is having information reproduced from it. This difference in rotational speed is shown graphically in FIG. 5. In a case where the PCM signal is an eight to fourteen modulation (EFM) signal, such a signal can have an adverse effect on the low frequency element of the FM video signal if the digital signal is superposed directly on the FM video signal during recording. Therefore, although the EFM signal is modulated to the same extent, it is recorded with a signal level which is suppressed by several tens of dB for the video carrier, as shown in FIG. 4. Consequently, since the frequency characteristic and amplitude of the same EFM signal may be different in reproducing operations carried out in the CD region and the video region, the demodulation system is used in common by switching the signal processing system for the reproduced EFM signal between circuitry for the CD region and circuitry for the video region.

When the reproduced RF signal is an EFM signal during reproduction of information stored in the CD region, the detected EFM signal is passed to an equalizer circuit 26 having predetermined equalizing characteristics, to provide frequency compensation. The output of equalizer 26 is passed to an amplifier 27 having a predetermined gain. For an EFM signal reproduced from information recorded in the video region, the EFM signal included in the reproduced RF signal, together with the FM video signal, are extracted by an EFM extraction circuit 28 which includes an LPF and other appropriate circuitry which would be known to those of ordinary skill in the relevant technological field.

The output of the EFM extraction circuit 28 is passed to an equalizer circuit 29 which performs frequency compensation, the equalizer circuit 29 having a different characteristic from that of the circuit 26. The output of the equalizer 29 is passed to an amplifier 30 having a gain larger than that of amplifier 27. By providing this slightly different circuit for an EFM signal reproduced from the video region, is possible to provide, as an output to the selector circuit 25, an EFM signal having a frequency characteristic and amplitude the same as those derived from the reproducing operation for information recorded in the CD region.

As an aside, it should be noted that when a compact disk is being used in the circuitry of FIG. 1A, as opposed to a composite disk, the selector switch 25 always is set to the side a.

Whether the side a or side b is selected by the selector circuit 25 in accordance with an output of the system controller 21, the output of the selector switch 25 is supplied to a demodulating/correcting circuit 31, which demodulates the EFM signal for writing to memory, such as a RAM. The circuit 31 also controls the memory in accordance with a clock signal provided by a reference clock generator 32. The circuit 31 further executes a deinterleaving operation through processing of data, and error correction using parity included in the data, and yet further detects control information.

The digital audio signal which is output by the demodulating and correcting circuit 31 is processed by an audio signal processing circuit 33 which comprises a D/A converter and a deglitcher circuit. The output of the circuit 33 then is supplied to appropriate ones of audio output terminals 34L, 34R corresponding to left and right channels, respectively.

A position detector 35 is provided in the vicinity of the path of the pickup 3, to detect whether the beam emitted from the pickup 3 has reached a radial position corresponding to a vicinity of the boundary between the CD region 1a and video region 1b in the composite disk. The position detector 35 generates an appropriate detection signal accordingly. The generation of that signal indicates that the pickup 3 has reached the video region 1b. Any appropriate detector, such as an optical sensor, may be used, and such detectors have well known structures. The output of the detector 35 also is supplied to the system controller 21.

The system controller 21 comprises a microcomputer which includes a central processing unit (CPU), read only memory (ROM), and a random access memory (RAM). The horizontal and vertical synchronous signals and the control data output by the separation circuit 12, as well as control data output by the demodulating/correcting circuit 31 are provided to the system controller 21. Other information provided to the system controller 21 includes information which identifies whether a compact disk or a composite disk is being used in the disk player, and information which indicates whether only the CD region 1a or the video region 1b, or both regions are to have information reproduced therefrom during a reproducing operation. The CPU of the system controller 21 processes the input information (input signal) in accordance with a program previously stored in the ROM to control portions of the disk player such as a drive circuit (not shown) which drives the selection switches 15, 25; memory control circuit 19; spindle motor 2; the drive circuit 37 which drives the slider motor; and a display portion 38, among other elements.

Also shown in FIG. 1A is an operation section 36, through which a user inputs operational commands to the disk player via the system controller 21.

Reference now will be made to the flowchart of FIG. 2A to illustrate the procedures of the search method of the present invention as executed by the CPU within the system controller 21.

When the user operates any of the keys in the section 36 during execution of a main operational routine of the disk player, or of a subroutine which controls operation of the player, the CPU determines whether a search instruction has been issued (an address search, step S1). If a search instruction has not yet been issued, operation returns to the routine which was being executed immediately before the calling of the subroutine illustrated in FIG. 2A. If a search instruction has been issued, then it is determined whether a reproducing operation is to be carried out in the video region 1b (step S2).

If the reproducing operation is to be carried out in the video region (answer yes in step S2), it is then determined whether the vertical synchronizing signal has been detected (step S3). This would indicate the beginning of a field of video information. Step S3 is executed repeatedly until a vertical synchronous signal is detected, at which point transmission of the write enable signal W is started (step S4). The vertical synchronous signal is again looked for (step S5) and this step is repeated until the signal is detected. Once the vertical synchronous signal has been detected, then transmission of the write enable signal W is stopped (step S6). As a result of the performance of these steps, as much as one field of video information is stored in the video memory 18 before a search operation is carried out. This would be the last field of video information before execution of the search operation.

Figure 2A:
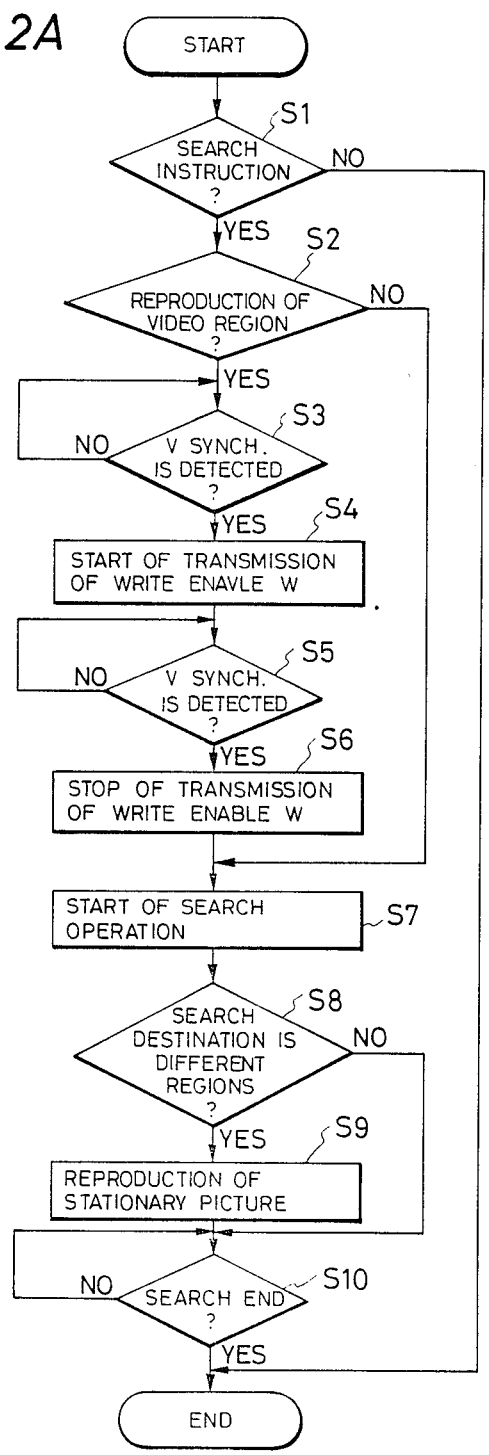
FIG. 2A is a flowchart of the search method of the present invention.

At this point in the flowchart of FIG. 2A, a search operation would be initiated. It should be noted that the flowchart also indicates that the routine can reach this point in execution if the answer at step S2 is "no"; that is, if a reproducing operation is being carried out for the CD region 1a. However, if the answer at step S2 is "no", then the video memory does not have additional information stored in it.

Search operations under both circumstances now will be described, starting with the case in which a reproducing operation is to be carried out for the video region 1b.

Upon starting of the search operation in step S7, it is determined whether the searching destination is set to a region different from the starting region (step S8) if the destination is different (in the case of searching in a video region, this would be the CD region), the selection switch 15 in FIG. 1A would be set to the side b, and a still picture would be reproduced by repeatedly reading the video information stored in the video memory 18 (step S9). The routine then waits for the end of the search operation (step S10). When the search ends, operation returns to the routine which is executed immediately before transfer of the routine in FIG. 2A.

However, if the answer at step S8 is "no" (that is, if the search destination is not in a different region), the still picture is not reproduced, and the routine merely waits for the end of the search (step S10).

In the case in which the answer to step S2 is "no", that is, when the reproducing operation is to be carried out for the CD region 1a, the search instruction is initiated (step S7), and then it is determined whether the search destination will go into the video region (step S8). If the answer at step S8 is "yes", and a reproducing operation has been carried out for the video region, then one field of video information would be stored in the video memory 18, unless the disk has been ejected at some point. Thus, a still picture may be reproduced by repeatedly reading the video information (step S9). However, if a reproducing operation in the video region has not yet been carried out, then there would be no video information stored in the video memory 18, and the still picture could not be reproduced.

However, even if video information itself is not stored in the video memory, it may be possible to store, for example, video information corresponding to an entirely blue picture preliminarily in the video memory during the rise time of the system at initialization. Alternatively, information such as blue picture information may be provided by a character generator during initialization of the system. In any event, whether or not a still image is reproduced, the flow of the program moves to step S10, to wait for the end of the search.

In accordance with the operations which have just been described, the video information stored in the video memory 18, or other appropriate information which may be provided during initialization of the disk player, may be displayed on the television monitor even during a search operation which crosses between the video region 1b and the CD region 1a. Thus, according to the search method of the present invention, it is possible to display pictures on the television monitor even during a search operation which encompasses two different regions. As a result, noise generated on the display may be eliminated through previous storage of the last reproduced video information detected during a reproducing operation, that stored information being read out repeatedly during the search operation.

Now, the implementation of the method of the present invention by which a still frame is reproduced during an interruption or suspension of power to the disk player during a reproducing operation will be discussed, with reference to the flowcharts of FIGS. 2B and 2C, and to the circuit structure shown FIG. 1B.

Figure 1B:
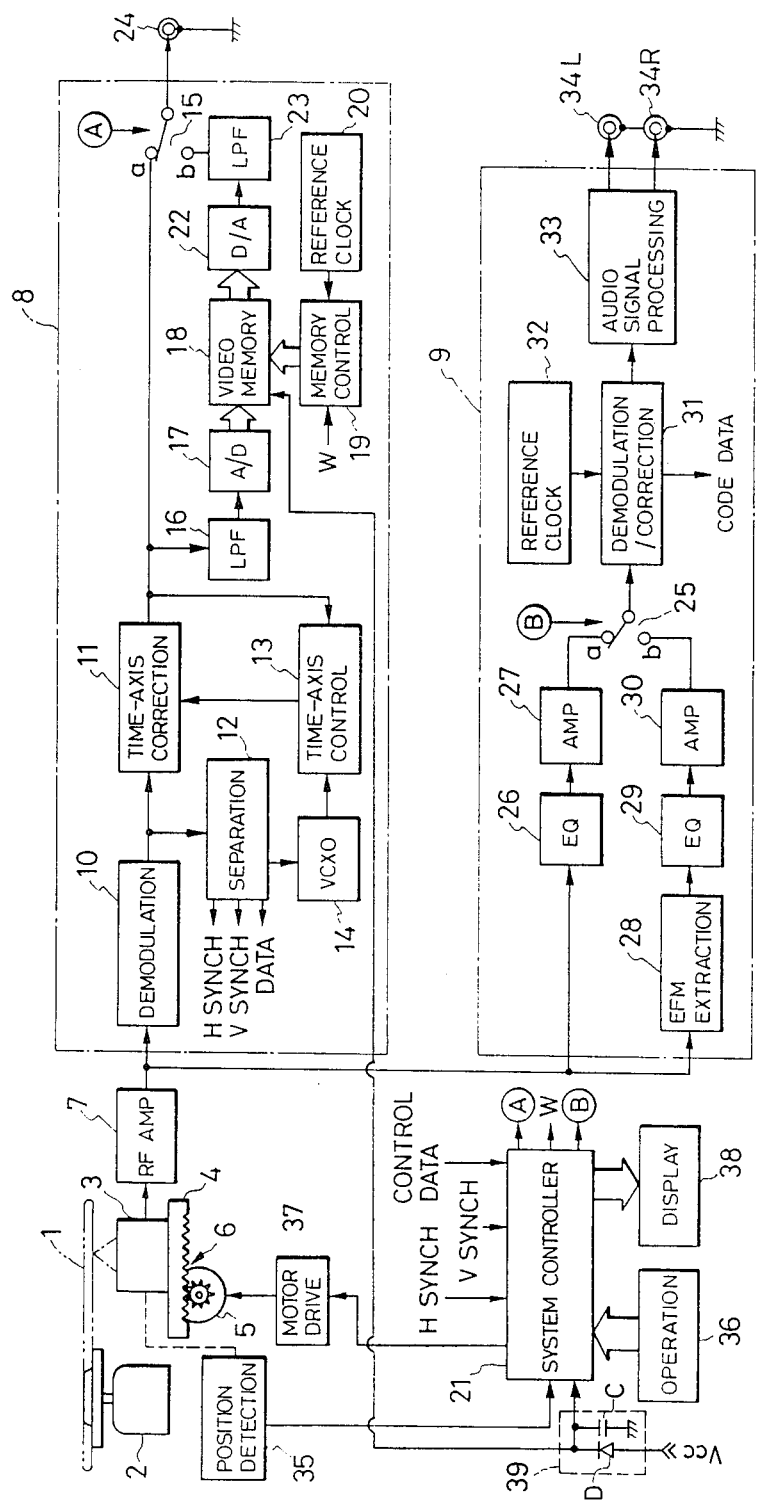

First of all, with respect to the circuitry shown in FIG. 1B, that circuitry is almost identical to what is shown in FIG. 1A, with the following exception. In FIG. 1B, the main power supply $V_{cc}$ is supplied to the power terminal of system controller 21 through a backup circuit 39 comprising a diode D and a capacitor C. The main power supply is supplied through the diode, and the capacitor is connected between the power supply terminal and ground. The backup power source is supplied to the system controller 21 if the main power supply fails. Backup power is supplied not only to the system controller 21, but also to the video memory 18 in the video demodulation system 8, through the power supply terminal of that memory 18. Consequently, the video memory 18 also may be operated by the backup power supply even if the main power supply fails.

Figure 2B:
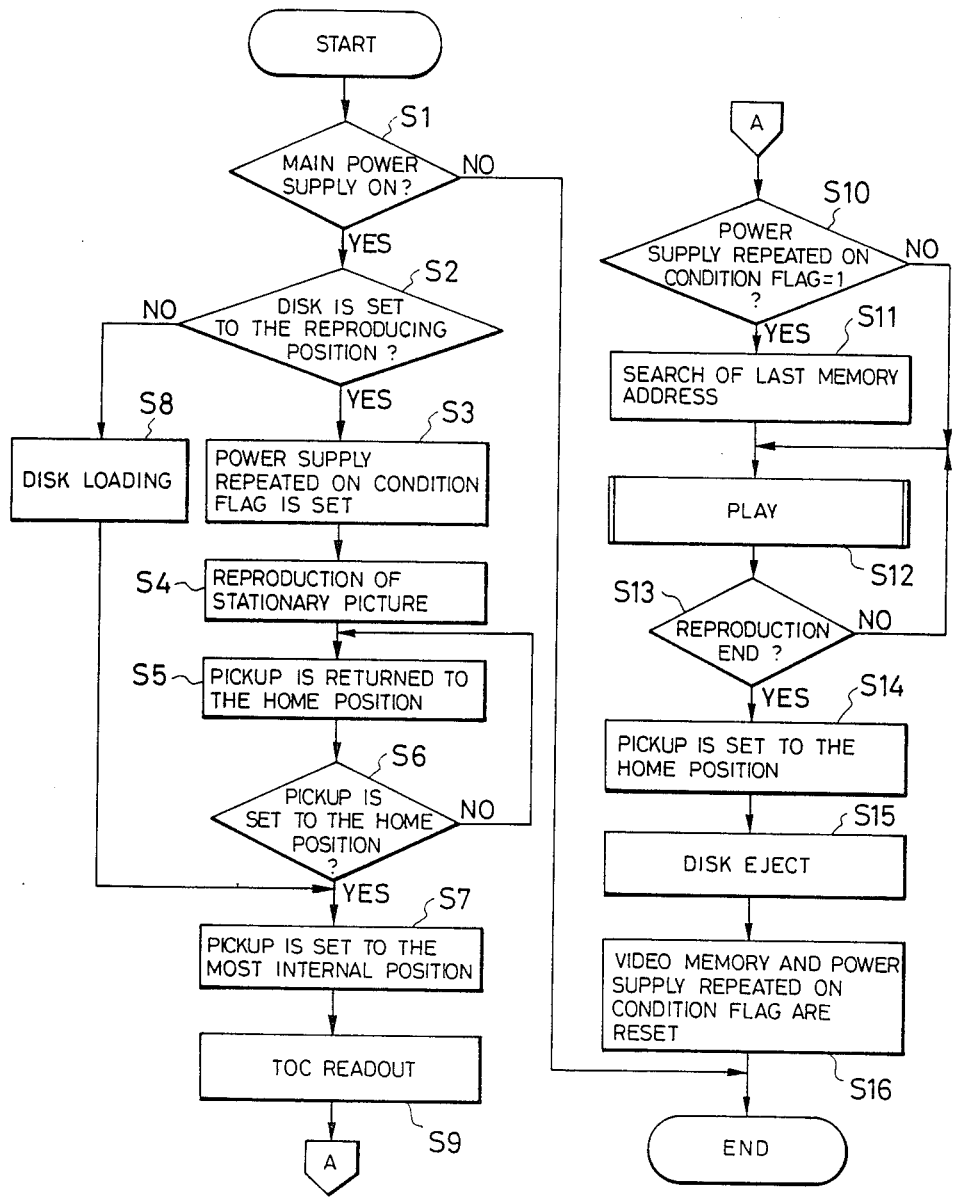
FIGS. 2B and 2C are flowcharts of the picture reproduction method of the present invention necessitated during power interruption.

Now, with respect to the flowchart shown in FIG. 2B, the CPU in execution of the routine first determines whether the main power supply is on. If it is not, control is returned to the last called routine, and the routine shown in FIG. 2B ends. If the main power supply is on, then in a step S2 it is detected whether the disk is set in a reproducing position. If it is not, it is determined that the disk has not been loaded yet (i.e., there has been no power interruption, and this is a true initialization), and so a disk loading step is performed in step S8. If the disk is in the reproducing position, then it is determined that there has been a turning off of the main power supply during a reproducing operation of the disk (i.e., a power interruption). Thus, a power supply resetting flag is set in a step S3.

Since there has been an interruption of power, it is necessary to reinitialize the disk player by getting it to rotate up to speed. Accordingly, in a step S4, the video information stored in the video memory 18 is read repeatedly, the selection switch 15 in FIG. 1B being set to the side b to enable this. The video memory 18 will contain a field of information, and thus will be able to output a still picture in accordance with the operation of the backup power supply even if the main power supply is off, so long as the final readout video information has been stored, unless the disk has been ejected in the meantime.

Once the still picture is being reproduced, the CPU returns the pickup to a home position (step S5). It should be noted that at the time of power interruption, the pickup would have been at a readout position immediately before power interruption. The routine cycles through the step S6 until the pickup is returned to the home position.

Once the pickup is returned to the home position, it is sent to the most internal position on the disk containing video information (step S7). This position may be the most internal overall position on the disk if a video disk is being played, or simply may be the most internal position of the region 1b. This step is carried out whether or not the disk was in the reproducing position at step S2. Once it has been detected that the pickup has reached the innermost track, the CPU reads a table of contents (step S9) which is contained at that track, once the pickup has been focused on that track. This information indicates contents of respective regions on the disk surface.

After this step has been carried out, it is detected whether the repeated power supply on flag has been set or not (step S10). Note that this flag will be set if the disk had been set to the reproducing position, but would not have been set if the disk was not at the reproducing position at step S2. If the flag has been set, the last address prior to power interruption is searched (step S11). Otherwise the playing operation is merely started in step S12.

If the reproducing operation has not ended (step S13), the playing operation in step S12 is continued. Once reproduction has ended, the pickup is sent to the home position (step S14), and the disk is ejected (step S15). When it is detected that the disk has been ejected, the video memory 18 and power supply repeated on flag are reset (step S16), thus ending the series of operations shown in FIG. 2B.

Figure 2C:
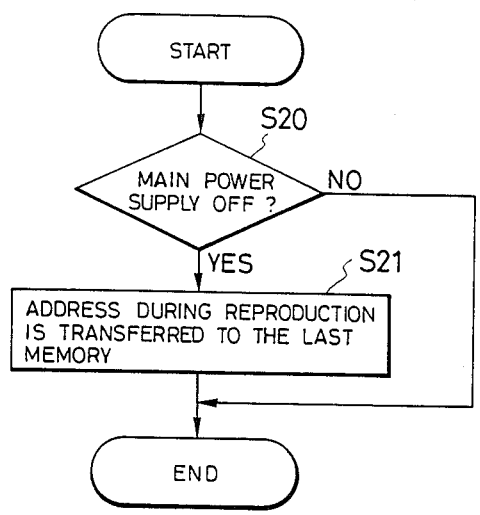

Referring back now to the playing operation in step S12, and referring to the flowchart in FIG. 2C, it is detected in step S20 whether the main power supply is off. If it is not, the most recent address identifying the position on the disk from which video information was recorded in the memory 18 is transferred to memory in step S21. More specifically, when it is determined that there is a main power supply failure by detecting a power switch off condition while a playing operation is being carried out, the CPU transfers frame number data as an address which indicates the position at which the most recent read out video information has been recorded to a predetermined address in the address memory. In this manner, the frame number of the most recent video information is written into the address memory.

As just described, if the main power supply somehow is turned off or otherwise is interrupted during a reproducing operation of a video region of a composite disk, previously-reproduced video information which is stored in a video memory can be displayed on the television monitor during the rise time of the disk player at reinitialization. Thus, reproduction of noise to the television monitor can be prevented during this rise time, and the point of reproduction at the time of interruption can be recovered and remembered easily and quickly. Additionally, since the last known address during the reproducing operation is stored prior to the time of interruption, there is no need to conduct an additional search for that point after reinitialization. This makes the operation of the disk player more efficient.

The operation of the foregoing embodiment has been described with respect to a composite disk, but is equally applicable when a video disk is used.

As just explained, in accordance with the present invention, when the main power supply is interrupted, the most recent video information reproduced immediately before the power interruption is stored in a video memory, and may be repeatedly output to a television monitor during rise time which occurs during the reinitialization of the disk player. Thus, the reproducing operation also can be restarted from the last known point before the interruption. As a result, reproduction of the noise can be prevented during the rise period which is relatively long for video players because disk rotational speed is higher for a video disk than for an audio CD disk.

The invention should not be considered as limited by the specific description provided above, but rather is limited only by the scope of the appended claims which follow immediately.

What is claimed is;

1. In a disk player which reproduces video information stored on an information recording disk, a search method comprising the following steps:
   during reproduction of said video information from said information recording disk, providing an instruction to initiate a search;
   when said search has been initiated, determining whether a field of said video information has been stored in a video memory of said disk player; and
   if said field of said video information has been stored in said video memory, reading out said field of video information repeatedly until said search is complete.

2. A search method as claimed in claim 1, wherein said information recording disk comprises a first region for storing audio information and a second region for storing said video information, said method further including the step of moving a pickup of said disk player in both of said first and second regions, said step of reading out said field of video information being performed repeatedly during movement of said pickup.

3. A method as claimed in claim 1, wherein, if said field of video information has not been stored in said video memory, said method comprises the step of reading out other video information to said television monitor during reinitialization of said disk player.

4. A method as claimed in claim 3, wherein said other video information comprises blue picture information.

5. A method as claimed in claim 3, wherein said step of reading out said other video information comprises the step of generating said other video information from a picture generator.

6. In a disk player, for reproducing video information stored on an information recording disk, said disk player comprising a video memory for storing at least one field of video information, a main power supply, and a backup power supply which provides power to said video memory during interruption of said main power supply, said method comprising:
   during a reproducing operation in which said video information is reproduced by said disk player from said information recording disk, storing a most recent field of video information in said video memory just prior to detection of an off condition of said main power supply; and
   during said off condition of said main power supply, repeatedly reading said field of video information stored in said video memory, said step of repeatedly reading said field of video information being carried out even after detection of an on condition of said main power supply, during reinitialization of said disk player, until said reinitialization is complete.

7. A method as claimed in claim 6, wherein said information recording disk comprises a disk on which only said video information is stored.

8. A method as claimed in claim 6, wherein said information recording disk comprises a composite disk for storing audio information in a first region thereof, and said video information in a second region thereof.

9. A method as claimed in claim 8, wherein said storing step includes the step of storing a most recent address indicative of a location of a pickup of said disk player just prior to said detection of said off condition; said method further comprising the step of, after said reinitialization of said disk player, returning said pickup to said location.

* * * * *